US012677975B2

(12) United States Patent　　　(10) Patent No.:　US 12,677,975 B2

Rana　　　(45) Date of Patent:　Jul. 14, 2026

(54) MACHINE AND METHOD FOR COOKING FOOD

(71) Applicant: PASTIFICIO RANA S.P.A., San Giovanni Lupatoto (IT)

(72) Inventor: Gian Luca Rana, San Giovanni Lupatoto (IT)

(73) Assignee: PASTIFICIO RANA S.P.A. (IT)

( * ) Notice: Subject to any disclaimer, the term of this patent is extended or adjusted under 35 U.S.C. 154(b) by 293 days.

(21) Appl. No.: 18/289,915

(22) PCT Filed: May 11, 2022

(86) PCT No.: PCT/IB2022/054380
§ 371 (c)(1),
(2) Date: Nov. 8, 2023

(87) PCT Pub. No.: WO2022/238922
PCT Pub. Date: Nov. 17, 2022

(65) Prior Publication Data
US 2024/0277175 A1　　Aug. 22, 2024

(30) Foreign Application Priority Data

May 12, 2021　　(IT) ........................ 102021000012206

(51) Int. Cl.
*A47J 27/04*　　　(2006.01)
(52) U.S. Cl.
CPC .......... *A47J 27/04* (2013.01); *A47J 2027/043* (2013.01)

(58) Field of Classification Search
CPC . A23L 5/13; A23L 7/111; A23L 7/113; A23V 2300/38; A47J 2027/008; A47J 2027/043; A47J 27/16; A47J 27/18; A47J 36/32; A47J 27/04; A47J 2027/006
See application file for complete search history.

(56) References Cited

U.S. PATENT DOCUMENTS

| | | | | |
|---|---|---|---|---|
| 4,821,632 A | * | 4/1989 | Bolzani ................... | A47J 27/18 |
| | | | | 99/413 |
| 5,142,966 A | * | 9/1992 | Morandi ................. | A47J 27/18 |
| | | | | 99/330 |
| 5,361,682 A | * | 11/1994 | Crolla ..................... | A47J 27/18 |
| | | | | 426/523 |
| 7,001,637 B2 | * | 2/2006 | Cusenza ................. | A47J 27/16 |
| | | | | 426/511 |

(Continued)

FOREIGN PATENT DOCUMENTS

| | | |
|---|---|---|
| JP | S59103621 A | 6/1984 |
| JP | H06304067 A | 11/1994 |

(Continued)

*Primary Examiner* — Jesse S Bogue
(74) *Attorney, Agent, or Firm* — The Belles Group, P.C.

(57)　　　ABSTRACT

A machine for cooking food has a dispenser configured to be arranged over a container containing food and to close the container and comprising at least one first opening to dispense steam into the container and at least one second opening to dispense hot water into the container; at least one first boiler and one first duct to supply steam to the first opening; and at least one second boiler and one second duct to supply hot water to the second opening and a third duct to supply hot water to the first boiler from the second boiler.

10 Claims, 2 Drawing Sheets

(56)          References Cited

U.S. PATENT DOCUMENTS

| | | | | |
|---|---|---|---|---|
| 8,808,638 B2 * | 8/2014 | Tomoda | .................. | A23B 4/26 |
| | | | | 62/96 |
| 2021/0235732 A1 * | 8/2021 | Rana | ......................... | A23L 5/13 |
| 2022/0211205 A1 * | 7/2022 | Lee | .......................... | A23L 5/13 |

FOREIGN PATENT DOCUMENTS

| | | | | | |
|---|---|---|---|---|---|
| KR | 20170109203 A | 9/2017 | | | |
| WO | 2009141995 A1 | 11/2009 | | | |
| WO | 2019207509 A1 | 10/2019 | | | |
| WO | WO-2019207508 A1 * | 10/2019 | .............. | A23L 5/13 |
| WO | 2020212207 A1 | 10/2020 | | | |
| WO | 2020212909 A1 | 10/2020 | | | |

* cited by examiner

MACHINE AND METHOD FOR COOKING FOOD

CROSS-REFERENCE TO RELATED APPLICATIONS

This patent application is a U.S. national stage application under 35 U.S.C. § 371 of PCT Application No. PCT/IB2022/054380, filed on May 11, 2022, which claims priority to Italian Patent Application No. 102021000012206, filed on May 12, 2021. The entire disclosures of the aforementioned priority applications are incorporated herein by reference in their entireties.

TECHNICAL FIELD OF THE INVENTION

The present invention relates to a machine and to a method for cooking food.

In particular, the present invention relates to a machine and to a method for cooking food by means of the supply of hot water and steam.

STATE OF THE ART

Within the scope of the quick catering industry, it is known to use machines for cooking fresh food and/or for heating precooked food by means of the use of steam.

Patent applications No. WO 2019/207509, NO. WO 2020/212909 and No. WO 2020/212207 of the applicant teach how to cook fresh food contained in a container by means of the supply of hot water and steam in the container containing the food.

Generally, the machines for cooking fresh food by means of water and steam require a high consumption of steam in the periods of continuative use. In particular, the cooking of fresh food prepared in accordance with specific recipes requires a supply of steam prolonged over time. In order to deal with the aforementioned uses, it would be necessary to manufacture a boiler for the generation of steam of large dimensions which, consequently, would increase the weight and bulks of the machine in its whole.

The object of the present invention is to provide a machine for cooking food, which allows mitigating the drawbacks of the prior art.

SUBJECT AND SUMMARY OF THE INVENTION

According to the present invention, a machine for cooking food is provided, the machine comprising:
- a dispenser configured to be arranged over a container containing food and to close the container and comprising at least one first opening for dispensing steam into the container and at least one second opening for dispensing hot water into the container;
- at least one first boiler and one first duct for supplying steam to the first opening; and
- at least one second boiler and one second duct for supplying hot water to the second opening and a third duct for supplying hot water to the first boiler from the second boiler.

Thanks to the present invention, it is possible to supply hot water from the second boiler to the first boiler by means of the third duct during the cooking of the fresh food, standing up to a possible high consumption of steam.

Furthermore, in this manner the supply of hot water from the second boiler to the first boiler takes place independently of the supply of hot water from the second opening and of the supply of steam from the first opening, allowing controlling with accuracy the quantity of hot water inside the first boiler in every instant of the cooking process of the fresh food.

Additionally, the supply of the first boiler with hot water heated by the second boiler allows reducing the thermal jump inside the first boiler during the refilling of the first boiler.

In particular, the machine comprises a first solenoid valve for controlling the steam supply along the first duct.

In this manner, it is possible to control the start and the end of the supply of steam into the container and/or determine supply intervals of steam into the container.

In particular, the machine comprises a second solenoid valve for controlling the supply of hot water along the second duct and a third solenoid valve for controlling the supply of steam along the third duct.

Thanks to the second solenoid valve, it is possible to control the start and the end of the supply of hot water into the container and/or determine supply intervals of hot water into the container.

Furthermore, thanks to the third solenoid valve, it is possible to control the refilling modes of the first boiler with hot water.

In particular, the machine comprises a control unit configured to control the first, the second and the third solenoid valves.

More specifically, the control unit is configured to control the third solenoid valve depending on the state of the first solenoid valve.

In use, when the first solenoid valve is open and determines the supply of steam into the container, it is possible to open the third solenoid valve and refill the first boiler with hot water so as to maintain a suitable level of hot water in the first boiler during the cooking process of the food.

In particular, the control unit comprises a user interface configured to select a cooking process of the food from a plurality of cooking processes of the food; the control unit being configured to control the first, the second and the third solenoid valves depending on the selected cooking process of the food so as to dispense steam and/or hot water into the container and supply hot water to the first boiler from the second boiler according to the cooking parameters associated with the selected cooking process.

In particular, the machine comprises a level probe associated with the first boiler and configured to emit a level signal related to the level of water in the first boiler; the control unit being configured to control the third solenoid valve depending on said level signal.

In use, in case the level signal is below a given reference threshold, the control unit controls the opening of the third solenoid valve so as to supply hot water into the first boiler and re-establish a suitable level of water in the first boiler.

In particular, the control unit is configured to control the third solenoid valve intermittently with opening and closing cycles of duration equal to tenths of a second so as to prevent the alteration of the properties of the steam inside the first boiler.

In particular, the machine comprises a fourth duct configured to evacuate steam from the container of food.

More specifically, the fourth duct is connected to a steam discharge.

In this manner, it is possible to evacuate the excess steam from the container, limiting the pressure inside the container and preventing the condensate formation in the container.

A further object of the present invention is to provide a method for cooking food which allows mitigating the drawbacks of the prior art.

In accordance with the present invention, a method for cooking food is provided, the method comprising:

dispensing steam into a container containing food through at least one first opening of a dispenser arranged over the container;

dispensing hot water into the container containing the food through at least one second opening of the dispenser;

supplying steam to the first opening from at least one first boiler and through a first duct;

supplying hot water to the second opening from at least one second boiler and through a second duct; and supplying hot water to the first boiler from the second boiler through a third duct.

Thanks to the present method, it is possible to refill the first boiler with hot water during a cooking process, standing up to a possible high consumption of steam and reducing at the same time the thermal jump inside the first boiler.

BRIEF DESCRIPTION OF THE DRAWINGS

The invention is described in the following with reference to the accompanying drawings, which illustrate a non-limiting example embodiment thereof, wherein.

DETAILED DESCRIPTION OF PREFERRED EMBODIMENTS OF THE INVENTION

Figure 1:
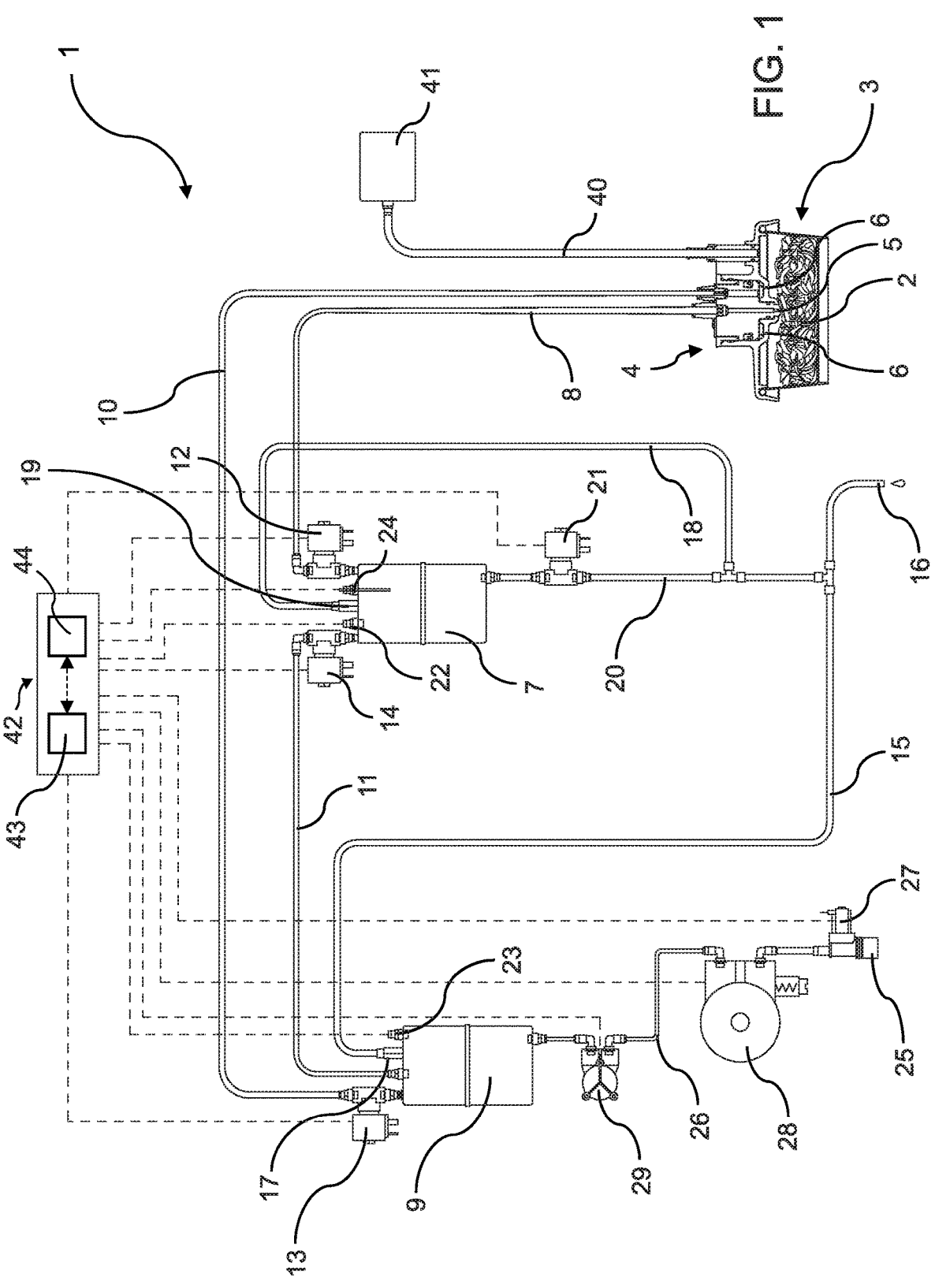
FIG. 1 is a schematic view, with parts removed for clarity, of a machine for cooking food.

With reference to FIG. 1, reference numeral 1 indicates, as a whole, a machine for cooking food 2 in a container 3 containing said food 2.

The machine 1 can be used in public catering places (for example coffee bars, restaurants, diners etc.) or at home.

In accordance with a non-limiting embodiment of the present invention, the food 2 contained in the container 3 can be a dose of raw pasta or a sauce for said dose of pasta.

The machine 1 comprises a dispenser 4 configured to be arranged over the container 3 and to close the container 3 and comprising at least one opening 5 for dispensing steam into the container 3 and at least one opening 6 for dispensing hot water into the container 3; at least one boiler 7 and one duct 8 for supplying steam to the opening 5; and at least one boiler 9 and one duct 10 for supplying hot water to the opening 6 and one duct 11 for supplying hot water to the boiler 7 from the boiler 9.

Although in the case described and illustrated herein the machine 1 comprises one single boiler 7 and one single boiler 9, it is understood that the machine 1 can comprise a plurality of boilers 7 and/or a plurality of boilers 9.

In accordance with an embodiment, each boiler 7, 9 comprises electric resistors, not shown in the accompanying figures, for adjusting the quantity of heat provided and, consequently, the steam temperature and the hot water temperature, respectively.

In particular, the boiler 7 is configured to heat the steam at a temperature ranging between approximately 105° C. and approximately 135° C., and the boiler 9 is configured to heat the hot t water at a temperature ranging between approximately 90° C. and approximately 105° C.

The machine 1 further comprises a solenoid valve 12 for controlling the supply of steam along the duct 8; a solenoid valve 13 for controlling the supply of hot water along the duct 10; and a solenoid valve 14 for controlling the supply of steam along the duct 11.

In particular, the machine 1 comprises a duct 15 for supplying hot water from the boiler 9 to a discharge 16, and a safety valve 17, which is coupled to the boiler 9, is in fluidic communication with the duct 15 and is configured to allow the passage of the hot water in the duct 15 in case the pressure inside the boiler 9 exceeds a given threshold.

In particular, the machine 1 comprises a duct 18 for supplying steam from the boiler 7 to the discharge 16, and a safety valve 19, which is coupled to the boiler 7, is in fluidic communication with the duct 18 and is configured to allow the passage of steam in the duct 18 in case the pressure inside the boiler 7 exceeds a given threshold.

Furthermore, the machine 1 comprises a duct 20 for supplying discharge water from the boiler 7 to the discharge 16, and a solenoid valve 21 configured to control the supply of discharge water to the discharge 16 along the duct 20.

In particular, the machine 1 comprises a temperature sensor 22, which is configured to emit a first temperature signal related to the temperature of the steam in the boiler 7; and a temperature sensor 23, which is configured to emit a second temperature signal related to the temperature of the hot water in the boiler 9.

Furthermore, the machine 1 comprises a level probe 24, which is associated with the boiler 7 and is configured to emit a level signal related to the level of water in the boiler 7.

In the case described and illustrated herein, the machine 1 comprises a connection 25 to a water supply network, which ensures an almost unlimited supply of water at ambient temperature; a duct 26 for supplying water at ambient temperature from the connection 25 to the boiler 9; a solenoid valve 27 for controlling the supply of water at ambient temperature along the duct 26; a pump 28, which is configured to provide a head sufficient for allowing the flow of the water inside the machine 1; and a flow-rate meter 29, preferably a flowmeter, which is configured to emit a flow-rate signal related to the flow-rate of the water running in the duct 26.

In accordance with a further embodiment, not shown in the accompanying figures, the machine 1 comprises, in alternative to the connection 25, a tank, which is configured to contain water at ambient temperature and is fluidically connected to the duct 26.

Figure 2:
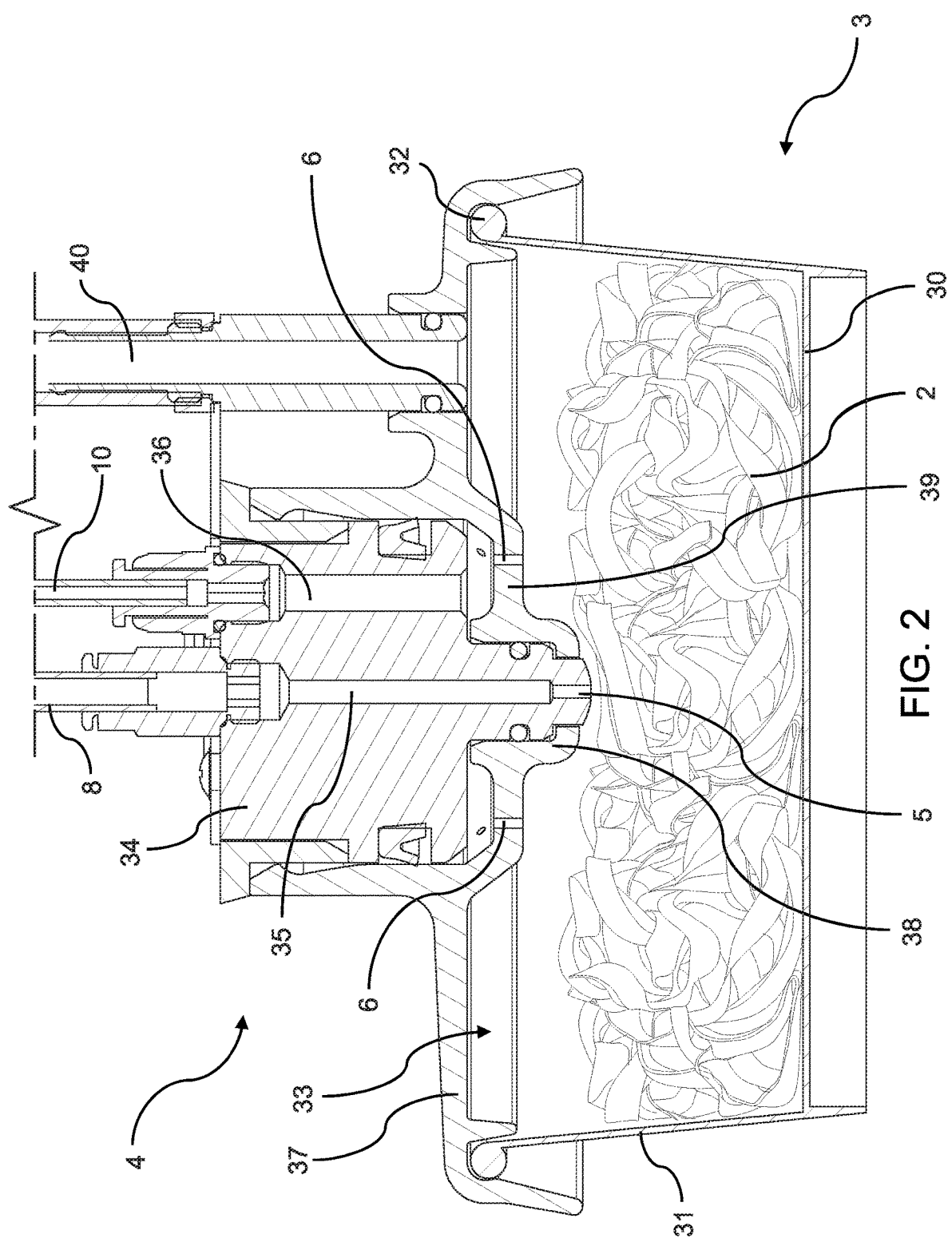
FIG. 2 is a detailed view of a detail of the machine of FIG. 1.

With reference to FIG. 2, the container 3 comprises a base wall 30, preferably having a circular shape; a side wall 31, preferably slightly flared, provided with an upper edge 32; and an opening 33, preferably having a circular shape, opposite the base wall 30.

The dispenser 4 comprises a central body 34 provided with a steam supply channel 35, which is in fluidic communication with the duct 8 and with the openings 5, and with a hot water supply channel 36, which is in fluidic communication with the duct 10 and with the openings 6; and a lid 37, which is arranged around the central body 34 and is configured to close the opening 33 of the container 3 so as to form a substantially closed cooking compartment for the cooking of the food 2.

In particular, the central body 34 comprises a central protrusion 38, which is provided with openings 5; and an annular wall 39, which extends around the central protrusion 38 and is provided with the openings 6.

With reference to FIG. 1, the machine 1 comprises a duct 40, which is configured to evacuate steam from the container 3 and is connected to a steam discharge 41. In particular, the duct 40 extends through the lid 37 so as to put the inside of the cooking compartment in fluidic communication with the steam discharge 41.

The machine 1 further comprises a control unit 42 configured to control the solenoid valves 12, 13 and 14. Furthermore, the control unit 42 is configured to control the solenoid valves 21 and 27 and the pump 28 and to receive the signals emitted by the temperature sensors 22 and 23, by the level probe 24 and by the flow-rate meter 29.

In particular, the control unit 42 is configured to control the solenoid valves 12, 13 and 14 depending on the signals received from the temperature sensors 22 and 23, from the level probe 24 and from the flow-rate meter 29.

More specifically, the control unit 42 is configured to control the solenoid valve 14 depending on the state of the solenoid valve 12, so as to supply hot water from the boiler 9 to the boiler 7 during the supply of steam into the container 3 for maintaining a suitable level of hot water inside the boiler 7.

Furthermore, the control unit 42 is configured to control the solenoid valve 14 depending on the level signal emitted by the level probe 24, so as to ensure a suitable level of water in the boiler 7 in every operational condition.

In accordance with a non-limiting embodiment of the present invention, the solenoid valves 12, 13 and 14 are on-off type. The control unit 42 is configured to control the solenoid valve 14 intermittently with opening and closing cycles of duration equal to tenths of a second.

Furthermore, the control unit 42 comprises a user interface 43 configured to allow the selection of a cooking process of the food 2 from a plurality of cooking processes of the food 2. The control unit 42 is configured to control the solenoid valves 12, 13 and 14 depending on the selected cooking process of the food 2.

In accordance with an embodiment, the user interface 43 comprises a touch-screen panel, not shown in the accompanying figures, by means of which an operator can view and manually select a desired recipe.

In particular, the control unit 42 comprises a storage 44, in which a plurality of recipes is stored. Each recipe is associated with a plurality of cooking parameters which define a given cooking process.

More specifically, the plurality of cooking parameters comprises a total quantity of hot water to be dispensed inside the container 3; and/or a number of steps wherein the total quantity of hot water is supplied inside the container 3; and/or a total quantity of steam to be supplied inside the container 3; and/or a number of steps wherein the total quantity of steam is dispensed inside the container 3; and/or a delay time interval which intervenes between the start of the supply of steam and the start of the supply of the first step of hot water; and/or a delay time interval which intervenes between the end of the supply of steam and/or hot water and the emission of a notice signal for the removal of the container 3 of cooked food 2; and/or a flow rate of hot water to be dispensed inside the container 3.

Furthermore, the user interface 43 is configured to enable an operator to manually set said cooking parameters and to store said cooking parameters in the storage 44.

In use and with reference to FIG. 1, an operator arranges the container 3 containing food 2 under the dispenser 4 so that the lid 37 closes the opening 33 of the container 3 and selects by means of the user interface 43 the desired recipe from the plurality of recipes stored in the storage 44.

The control unit 42 associates a plurality of cooking parameters with the selected recipe and controls the solenoid valves 12, 13, 14, 21 and 27 and the pump 28 depending on said cooking parameters and on the signals emitted by the temperature sensors 22 and 23, by the level probe 24 and by the flow-rate meter 29.

In accordance with an embodiment, the control unit 42 controls the solenoid valve 14 depending on the state of the solenoid valve 12. In particular, the control unit 42 controls the opening of the solenoid valve 14 so as to allow the passage of hot water in the duct 11 and consequently the supply of hot water into the boiler 7 when the solenoid valve 12 is open and allows the supply of steam into the container 3. In this manner, it is possible to maintain a suitable level of hot water in the boiler 7 during the cooking process of the food 2 also when it is necessary to dispense a considerable quantity of steam inside the container 3.

In accordance with an embodiment, the control unit 42 controls the solenoid valve 14 depending on the level signal emitted by the level probe 24 and related to the level of water in the boiler 7. In particular, the control unit 42 receives the level signal and, in case the level signal is below a given reference threshold, controls the opening of the solenoid valve 14 so as to supply hot water into the boiler 7.

Any excess steam inside the container 3 is evacuated towards the steam discharge 41 through the duct 40.

During each cooking process, the control unit 42 controls the solenoid valves 12, 13 and 14 independently of each other. In this manner, it is possible to supply steam and hot water into the container 3 simultaneously and/or according to any sequence and it is possible to supply hot water from the boiler 9 to the boiler 7 simultaneously with the supply of steam and/or with the supply of hot water into the container 3 and/or according to any sequence.

It is evident that variations can be made to the present invention without departing from the scope of protection of the appended claims.

The invention claimed is:

1. A machine for cooking food, the machine comprising:
   a dispenser configured to be arranged over a container containing food and to close the container and comprising at least one first opening to dispense steam into the container and at least one second opening to dispense hot water into the container;
   at least one first boiler and one first duct to supply steam to the first opening;
   at least one second boiler and one second duct to supply hot water to the second opening and one third duct to supply hot water to the first boiler from the second boiler;
   a first solenoid valve to control the supply of steam along the first duct;
   a second solenoid valve to control the supply of hot water along the second duct, and a third solenoid valve to control the supply of hot water along the third duct; and
   a control unit configured to control the first, the second and the third solenoid valves;
   wherein the control unit is configured to control the third solenoid valve depending on the state of the first solenoid valve.

2. The machine as claimed in claim 1, wherein the control unit comprises a user interface configured to select a cooking process of the food from a plurality of cooking processes of the food; the control unit being configured to control the first, the second and the third solenoid valves depending on the selected cooking process of the food.

3. The machine as claimed in claim 1, and comprising a level probe associated with the first boiler and configured to emit a level signal related to the level of water in the first boiler; the control unit being configured to control the third solenoid valve depending on said level signal.

4. The machine as claimed in claim 1, wherein the control unit is configured to control the third solenoid valve intermittently with opening and closing cycles of duration equal to tenths of a second.

5. The machine as claimed in claim 1, and comprising a fourth duct configured to evacuate steam from the container of food.

6. The machine as claimed in claim 5, wherein the fourth duct is connected to a steam discharge.

7. A method for cooking food, the method comprising:

dispensing steam into a container containing food through at least one first opening of a dispenser arranged over the container;

dispensing hot water into the container containing food through at least one second opening of the dispenser;

supplying steam to the first opening from at least one first boiler and through a first duct;

supplying hot water to the second opening from at least one second boiler and through a second duct;

supplying hot water to the first boiler from the second boiler through a third duct;

controlling the supply of steam along the first duct by means of a first solenoid valve; controlling the supply of hot water along the second duct by means of a second solenoid valve; and controlling the supply of hot water along the third duct by means of a third solenoid valve; and controlling the third solenoid valve depending on the state of the first solenoid valve.

8. The method as claimed in claim 7, and comprising selecting a cooking process of the food from a plurality of cooking processes of the food; and controlling the first, the second and the third solenoid valves depending on the selected cooking process of the food.

9. The method as claimed in claim 7, and comprising emitting a level signal related to the level of water in the first boiler; and controlling the third solenoid valve depending on said level signal.

10. The method as claimed in claim 7, and comprising evacuating steam from the container of food through a fourth duct connected to a steam discharge.

* * * * *